United States Patent
Bergsagel

(10) Patent No.: US 7,283,618 B2
(45) Date of Patent: Oct. 16, 2007

(54) AUTOMATIC LINE PAIR DETECTION IN A MODEM

(75) Inventor: Jonathan E. Bergsagel, Sachse, TX (US)

(73) Assignee: Texas Instruments Incorporated, Dallas, TX (US)

( * ) Notice: Subject to any disclaimer, the term of this patent is extended or adjusted under 35 U.S.C. 154(b) by 418 days.

(21) Appl. No.: 10/107,851

(22) Filed: Mar. 27, 2002

(65) Prior Publication Data

US 2003/0185383 A1    Oct. 2, 2003

(51) Int. Cl.
H04M 1/24 (2006.01)
H04M 3/08 (2006.01)
H04M 3/22 (2006.01)

(52) U.S. Cl. .................................. 379/27.06
(58) Field of Classification Search ............... 379/1.04, 379/22.07, 27.03, 27.06

See application file for complete search history.

(56) References Cited

U.S. PATENT DOCUMENTS 5,048,054 A * 9/1991 Eyuboglu et al. ........... 375/222
6,584,148 B1  6/2003 Zitting et al.
6,633,628 B1 * 10/2003 Linder et al. ............ 379/22.07

* cited by examiner

Primary Examiner—Curtis Kuntz
Assistant Examiner—Alexander Jamal
(74) Attorney, Agent, or Firm—Steven A. Shaw; W. James Brady; Frederick J. Telecky, Jr.

(57) ABSTRACT

The present invention provides a solution that automatically detects and connects the properly terminated line pair and then allows modem training to proceed. The present invention can set a control parameter at the physical layer that establishes a training "state" for the modem (115). Training states can determine whether or not automatic line detection (375) is utilized. Automatic line detection (375) can be accomplished by measuring the power levels (345, 350) on each of the line pairs (145, 150) and then selecting the line pair (145, 150) that has the highest power level measurement (345, 350) as the line on which to continue training the modem (115). The selected line pair (355) can be stored for use as the properly terminated line pair.

18 Claims, 2 Drawing Sheets

AUTOMATIC LINE PAIR DETECTION IN A MODEM

FIELD OF THE INVENTION

The invention relates generally to telecommunications and, more particularly, to automatically detecting line pairs in a remote modem.

BACKGROUND OF THE INVENTION

The increased use of telephone twisted pair wiring for data communications has resulted in a push for faster modems and improved signaling protocols compatible with the public switched telephone network (PSTN). Examples of these improved protocols include a variety of digital subscriber line (DSL) communications such as asymmetric digital subscriber line (ADSL), symmetric digital subscriber line (SDSL), hi-bit rate digital subscriber line (HDSL) and very high rate digital subscriber line (VDSL). Each DSL variant represents a different transmission speed over a different distance of copper pair wiring.

ADSL offers differing upload and download speeds and can be configured to deliver in excess of eight (8) megabits of data per second (8000K) from the network to the customer. This is more than 120 times faster than dial-up service and 100 times faster than integrated services digital network (ISDN). ADSL enables voice and high speed data to be sent simultaneously over the existing telephone line. ADSL uses the existing analog local loop lines for digital data transfer (to and from the remote location). It shares the bandwidth of the local loop with the existing phone system and does not require modification to the central office (CO) switch. It is asymmetrical because the upstream transfer rate is slower than the downstream data rate. This means that the data transfer from the remote location to the CO is a different rate than the data transfer rate from the CO to the remote location.

For an ADSL based service, ADSL modems at the CO exchange data through telephone wiring with compatible ADSL modems at remote locations. The ADSL modems at the CO also exchange data with servers. The central office modem is sometimes referred to as an ADSL Transceiver Unit-Central Office or "ATU-C." The remotely located ADSL modem is sometimes referred to as an ADSL Transceiver UNIT-Remote or "ATU-R." Any telephone equipment that may be in use at the remote location is connected to the same telephone wiring as the ATU-R. An ATU-R is usually connected to the CO on two (2) line pairs, an outer pair and an inner pair. FIG. 1 diagrammatically illustrates an inner line pair 145 and an outer line pair 150 of an exemplary ADSL system. At CO 120, splitter 135 combines information from digital subscriber line access module (DSLAM) ATU-C 125 with analog data associated with plain old telephone service (POTS) switch 130. Data is sent from CO 120 through local loop 140 to ATU-R 115, which is controlled by Host 110. Data enters ATU-R 115 from CO 120 as an ADSL signal which ATU-R 115 decodes. Data is sent from ATU-R 115 to CO 120 as an upstream ADSL signal. The upstream ADSL signal is sent to DSLAM ATU-C 125 and then out to servers (not shown). Either inner line pair 145 or outer line pair 150, but not both, is properly terminated into DSLAM ATU-C 125 at CO 120. ATU-R 115 either has to know before hand or has to be able to detect which is the properly terminated line pair. Without this information, ATU-R 115 either cannot be trained or will be trained at significantly reduced data rates and therefore will not operate optimally.

Currently, there is no method for automatically detecting and connecting the properly terminated line pair in order to start modem training; user intervention is required. Remote modems that can connect on either the inner or outer pair of wires have a manual switch or a relay to switch between the two (2) line pairs. In the past, the switch or relay had to be preset by someone (either the modem distributor or the user) who knew which of the pairs would be properly terminated to the CO modem. This could have been set in the management software or in the driver software for the remote modem. However, the proper setting is still not detected automatically; data identifying the properly terminated line pair must be manually entered. Modem users must have prior knowledge regarding which is the properly terminated line pair. This knowledge can come either from the CO or from manually testing both line pairs. The user must manually change the modem to the properly terminated line pair (if the modem has the ability to switch pairs). In general, the user must make sure that the modem is connected to the correct pair and, if not, make the change manually.

It is therefore desirable to provide a solution that automatically detects and connects the properly terminated line pair and then allows modem training to proceed. The present invention can set a control parameter at the physical layer that establishes a training "state" for the modem. Training states can determine whether or not automatic line detection is utilized. Automatic line detection can be accomplished by measuring the power levels on each of the line pairs and then selecting the line pair that has the highest power level measurement as the line on which to continue modem training. The selected line pair can be stored for use as the properly terminated line pair.

BRIEF DESCRIPTION OF THE DRAWINGS

The above and further advantages of the invention may be better understood by referring to the following description in conjunction with the accompanying drawings in which corresponding numerals in the different figures refer to the corresponding parts, in which.

DETAILED DESCRIPTION

While the making and using of various embodiments of the present invention are discussed herein in terms of ADSL modems, it should be appreciated that the present invention provides many inventive concepts that can be embodied in a wide variety of contexts. The specific embodiments discussed herein are merely illustrative of specific ways to make and use the invention, and are not meant to limit the scope of the invention.

The present invention provides a solution that automatically detects and connects the properly terminated line pair and then allows modem training to proceed. The present invention can set a control parameter at the physical layer that establishes a training "state" for the modem. Training states can determine whether or not automatic line detection is utilized. Automatic line detection can be accomplished by measuring the power levels on each of the line pairs and then selecting the line pair that has the highest power level measurement as the line on which to continue modem training. The selected line pair can be stored for use as the properly terminated line pair.

Figure 2:
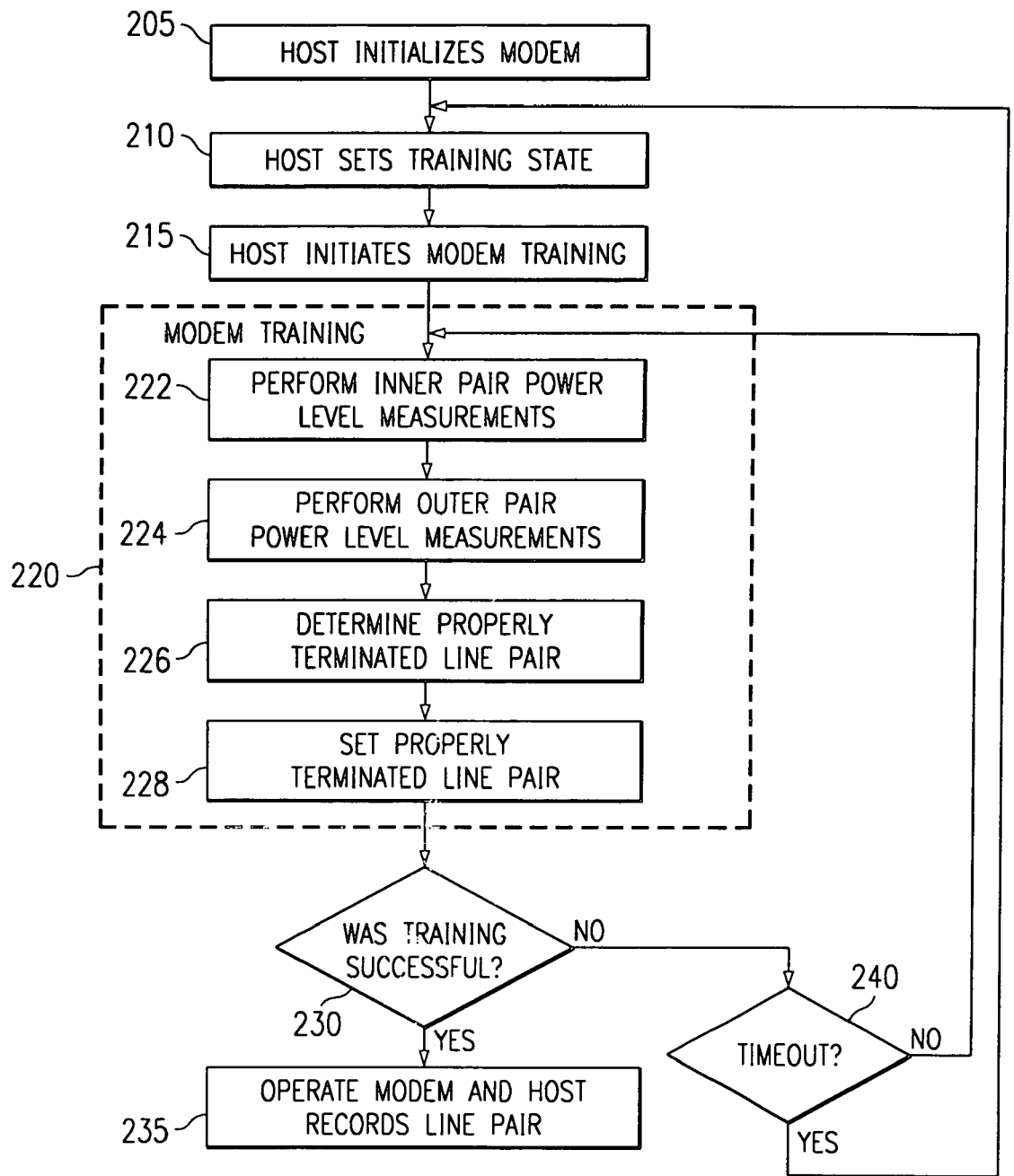
FIG. 2 illustrates an exemplary flow diagram of pair detection in accordance with the present invention.

The steps of the exemplary pair detection flow diagram of FIG. 2 can be implemented in the physical layer software of a remote asymmetric digital subscriber line (ADSL) modem (ATU-R) and/or in the host software responsible for managing the physical layer. The host, such as control software running on a processor which can be in the modem or on a personal computer (PC), initializes the ATU-R in block 205. This initialization includes loading any software necessary for the operation of the ATU-R, as well as any necessary set-up tasks. Next, in block 210, the host can set a control parameter at the ADSL physical layer to tell the ATU-R in which training state the ATU-R will run. The training state depends on the environment in which the ATU-R is operating. For example, the ATU-R could be used in a "modem certification event." In this case, the host code could be pre-configured with a setting for the pair detection control option that turns automatic pair detection off. Therefore, training would be attempted without automatic pair detection on the part of the ADSL physical layer. The line pair setting would then be chosen manually through the host using methods such as text commands or a control graphical user interface (GUI).

Another training state could be the customer "out of box experience" (OOBE). In this case, the host could set a control parameter to indicate that automatic line pair detection should be enabled and used with a timeout feature that will discontinue pair detection after a predetermined number of tries, such as twenty (20) attempts to detect the proper line pair, or after a predetermined period of time. If the ATU-R trains successfully after automatic pair detection by the ADSL physical layer, then the host can read the line pair setting from an associated variable in the physical layer and can save this information along with a flag to tell itself to not use the automatic pair detection feature in the future. These pieces of saved information can then be stored to some kind of non-volatile memory, such as flash memory or a file on a PC hard drive, to be recalled the next time a modem power cycle occurs or any time the modem needs to re-train with the central office (CO). In this manner, the host can always check this information in non-volatile memory to determine if automatic pair detection is needed or if the determination has already been made and recorded. After the first successful pair detection, the host can force the pair setting to the selected pair.

A third training state could be a change in the modem setup. In this case, the modem user could have the option to tell the host that a change, such as the service or the wiring, has occurred and that re-detection needs to be performed. The modem user could convey this to the host through such means as a GUI button. The host could then set a control parameter to indicate that training should occur in the same mode as OOBE, above. During a "normal usage" state, after initial determination of the properly terminated line pair, modem training could commence without further automatic pair detection. The normal usage state could be established by having the host read non-volatile memory to determine that detection has already occurred and then reading the selected pair settings in order to connect the modem to the properly terminated line pair. Modem training could then continue on the properly terminated line pair. Additionally, a diagnostic training state could be set by the host. In a diagnostic training state it could be useful if the training commenced with automatic pair detection on the part of the ADSL physical layer enabled, but with the timeout feature disabled. The host could change the control parameter to a different state to end the diagnostic session.

Once the training state has been set in block 210, the host initiates modem training in block 215. In addition to conventional modem training, modem training 220 of the present invention can include performing power level measurements on both the inner pair, block 222, and the outer pair, block 224. These measurements may be performed in any conventional manner and in any order. In this example, the ADSL physical layer software performs power level measurements on the inner pair first and then on the outer pair. In order to accomplish the power level measurement of block 222, the ADSL physical layer can check the inner pair power level on the initial response tones from the ADSL Transceiver Unit-Central Office (ATU-C). The inner pair power level measured on each response tone can then be saved for comparison with the outer pair power level measurements taken in block 224. After saving the inner pair power level, the ADSL physical layer can switch to the outer line pair and restart the training sequence, making the same measurements on the ATU-C response tones as described above. The outer pair power level measurements can then be saved.

The next step, block 226, in modem training 220 is to determine which of the line pairs is the properly terminated pair. For this, the ADSL physical layer can compare the power level measurements taken in blocks 222 and 224. ATU-R training can continue on the pair which has the highest power level measurements, indicating the properly terminated line pair. Performing the power comparison in this manner protects against selecting the wrong line pair as a result of crosstalk effects. If the most recently measured pair, in this case the outer pair, is not the properly terminated line pair, then the ADSL physical layer can switch to the other line pair and re-train on the properly terminated line pair. Otherwise, training can continue on the currently connected line pair. In block 228, modem training 220 sets the properly terminated line pair. This can be accomplished by having the ADSL physical layer software write a variable that tells the host on which line pair the ATU-R is attempting to complete its training. This variable has a value that represents the current line pair setting so that the host can determine the last line pair state that was set by the ADSL physical layer software.

After all training has been completed, a check can be made in conventional fashion at decision point 230 to determine whether or not the training was successful. If the training was determined to be successful in decision point 230, block 235 shows that ATU-R operation can continue normally and the host can record the correct line pair by reading the variable that was set by the ADSL physical layer software in block 228. However, if the training was not determined to be successful in decision point 230, decision point 240 can check for timeout conditions. More specifically, decision point 240 can check if a timeout feature was enabled and if the timeout period expired. If no timeout conditions are found in decision point 240, the ADSL physical layer can automatically restart the training sequence at block 222 and repeat the entire pair detection process.

However, if timeout conditions are found in decision point 240, further processing may be required. For example, if the timeout period expired, this can indicate that the modem never successfully trained before the maximum number of pair detection attempts was reached. In this case, a timeout flag can be set by the ADSL physical layer. This timeout flag can be visible to the host. Therefore, the host can prevent automatic pair detection from restarting until the host allows it by changing the training state in block 210. The host can switch the training state to allow itself to choose its own line pair setting manually, if needed. However, if it later becomes possible, modem training will still be able to proceed on the last connected line pair without the line pair detection being reactivated. The host can also reset the timeout period and let the modem try the automatic pair detection process again. In any of these situations, if timeout conditions were found in decision point 240, the host again sets the training state in block 210.

Figure 3:
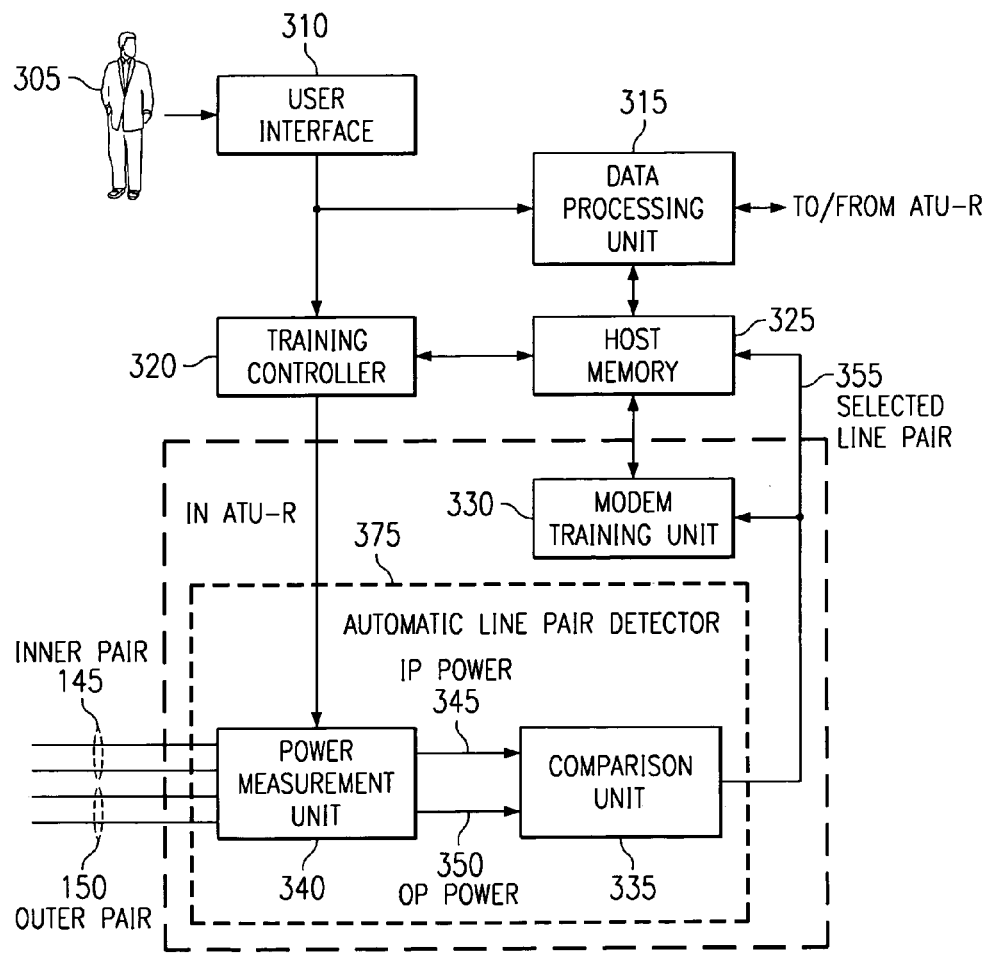
FIG. 3 diagrammatically illustrates pertinent portions of an exemplary embodiment of a host in accordance with the present invention.

In the pertinent portions of an exemplary embodiment of a host (e.g., a microprocessor, a DSP, a modem system, a controller and/or a PC) illustrated in FIG. 3, user 305 interacts with the host through user interface 310. User interface 310 can be embodied as, for example, a graphical user interface ("GUI"), a mouse, a keyboard and/or a pen. User interface 310 can directly access training controller 320 and data processing ("DP") unit 315. DP unit 315 can perform any desired data processing operations, and can communicate with modem ATU-R. Each or both of training controller 320 and DP unit 315 can be, for example, provided in a microprocessor or DSP. DP unit 315 can initialize modem ATU-R. The exemplary embodiment of FIG. 3 shows power measurement unit 340, comparison unit 335 and modem training unit 330 located in modem ATU-R. However, alternative embodiments can have these units located external to modem ATU-R. DP unit 315 exchanges information with host memory 325, which also exchanges information with training controller 320 and modem training unit 330. At least a portion of host memory 325 is non-volatile. Training controller 320 can, for example, interface with host memory 325 to set the training state, determine whether or not line pair detection was successful, indicate (or determine) that no line pair detection is needed, indicate (or determine) the last line pair state set by the modem, and determine whether or not a timeout occurred during line pair detection. Training controller 320 can also interface with automatic line pair detector 375 to initiate automatic line pair detection, for example, in response to a user request. Modem training unit 330 performs the actual modem training, for example, in conventional fashion. The operative connections for such conventional modem training are not explicitly shown in FIG. 3. Modem training unit 330 can determine from host memory 325 whether or not line pair detection is needed. If not, then modem training unit 330 can obtain selected line pair information from host memory 325 and begin training operations.

Inner line pair ("IP") 145 and outer line pair ("OP") 150 are routed through power measurement unit 340. Power measurement unit 340 in combination with comparison unit 335 can perform automatic line pair detection. Power measurement unit 340 measures the power levels on both IP 145 and OP 150. These measurements, IP power 345 and OP power 350, are then sent from power measurement unit 340 to comparison unit 335, where the properly terminated line pair is determined by selecting the line pair with the greater measured power. Therefore, if IP power 345 exceeds OP power 350, comparison unit 335 will send selected line pair information 355 to host memory 325 and modem training unit 330, indicating that the correctly terminated line pair is IP 145. Similarly, if OP power 350 exceeds IP power 345, host memory 325 and modem training unit 330 will be informed that the correctly terminated line pair is OP 150. Host memory 325 can record the correctly terminated line pair for future use and modem training unit 330 can begin or continue training operations once it receives selected line pair information 355.

Figure 1:
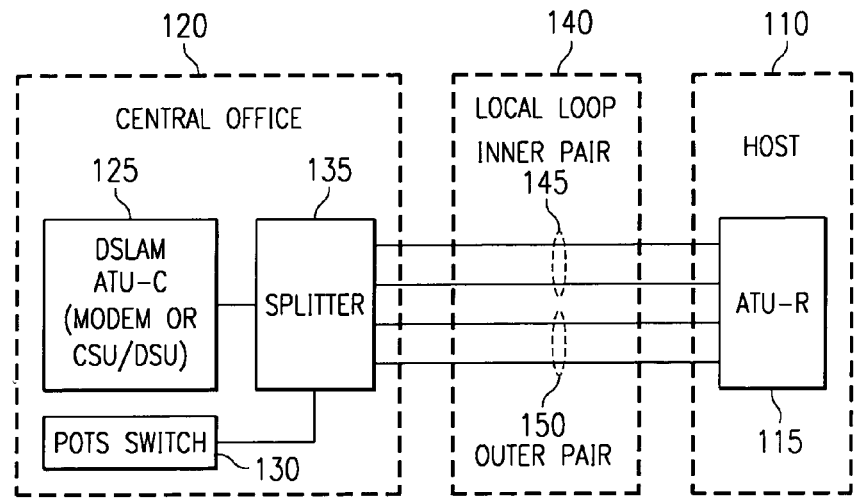
FIG. 1 diagrammatically illustrates an inner and an outer line pair of a conventional ADSL system in accordance with the art.

It will be evident to workers in the art that the embodiments of FIGS. 1-3 can be readily implemented by suitable modifications in software, hardware or a combination of software and hardware in a conventional host.

Although exemplary embodiments of the present invention have been described in detail, it will be understood by those skilled in the art that various modifications can be made therein without departing from the spirit and scope of the invention as set forth in the appended claims.

What is claimed is:

1. A method for selecting a line pair for communication in a modem, comprising:
   determining a training state for the modem;
   determining a training procedure based on direction from the training state
   performing a power level measurement on each of a plurality of line pairs of the modem;
   selecting a line pair with highest power level measurement for communication;
   identifying the selected line pair as properly terminated line pair;
   storing information regarding the selected line pair in memory; and
   begin a subsequent training procedure on the selected line pair.

2. The method of claim 1 wherein the plurality of line pairs includes an inner line pair and an outer line pair.

3. The method of claim 1 including setting a training state for the modem.

4. The method of claim 3 wherein the training state is a modem certification event.

5. The method of claim 3 wherein the training state is a customer out of box experience.

6. The method of claim 3 wherein the training state is a modem setup modification.

7. The method of claim 3 including modifying the training state upon expiration of a timeout period.

8. The method of claim 1 further comprising:
   after determining the properly terminated line pair, performing a modern training session on the properly terminated line pair.

9. The method of claim 1 further comprising:
   operating the modem on the properly terminated line pair.

10. A modem comprising:
    a plurality of line pairs;
    a power measurement unit coupled to said line pairs, said power measurement unit for performing a power level measurement on each of the plurality of line pairs;
    a determining unit coupled to the power measurement unit for receiving the power level measurements and selecting a line pair with highest power measurement for communication;
    a training controller for interfacing with a host controller and setting a training state;
    a training unit coupled to said determining unit for receiving from the determining unit information indicative of the selected line pair and conducting a modem training session with a training procedure based on direction from the training state on the selected line pair; and
    a host memory for storing information regarding the selected line pair including the training state.

11. The modem of claim 10 including a training controller directing the power measurement unit.

12. The modem of claim 10 wherein the determining unit selects a highest of the power level measurements as indicative of a properly terminated line pair.

13. The modem of claim 10 wherein the plurality of line pairs includes an inner line pair and an outer line pair.

14. A data processing system comprising:
a modem including a plurality of line pairs for input and output of data;
a data processing unit coupled modem for processing said data;
a user interface, said user interface enabling a user to interact with said data processing unit;
a power measurement unit coupled to said line pairs, said power measurement unit for performing a power level measurement on each of the plurality of line pairs;
a determining unit coupled to the power measurement unit for receiving the power level measurements and selecting a line pair with highest power measurement for communication;
a training controller for interfacing with a host controller and setting a training state;
a training unit coupled to said determining unit for receiving from the determining unit information indicative of the selected line pair and conducting a modem training session with a training procedure based on direction from the training state on the properly terminated line pair; and
a memory for storing information regarding the selected line pair.

15. The system of claim 14 wherein the user interface includes one of a graphical user interface, a mouse, a keyboard, and a pen.

16. The system of claim 14 wherein one of said power measurement unit, said determining unit, and said training unit is provided in said modem.

17. The system of claim 14 wherein the plurality of line pairs includes an inner line pair and an outer line pair.

18. The system of claim 14 wherein the determining unit selects a highest one of said power measurements as indicative of a properly terminated line pair.

* * * * *